US005774717A

United States Patent [19]

Porcaro

[11] Patent Number: 5,774,717
[45] Date of Patent: Jun. 30, 1998

[54] METHOD AND ARTICLE OF MANUFACTURE FOR RESYNCHRONIZING CLIENT/SERVER FILE SYSTEMS AND RESOLVING FILE SYSTEM CONFLICTS

[75] Inventor: Thomas Joseph Porcaro, Austin, Tex.

[73] Assignee: International Business Machines Corporation, Armonk, N.Y.

[21] Appl. No.: 572,926

[22] Filed: Dec. 15, 1995

[51] Int. Cl.[6] .................................................. G06F 17/30
[52] U.S. Cl. ............................................. 707/202; 707/10
[58] Field of Search .................................. 395/800, 618, 395/619, 181, 610

[56] References Cited

PUBLICATIONS

Satyanarayanan et al., "Coda: A Highly Available File System for a Distributed Workstation Environment", IEEE Transactions on Computers, vol. 39, No. 4, Apr. 1990, pp. 447–459.
Satyanarayanan et al., "On the Ubiquity of Logging in Distributed File Systems", Proceedings, Third Workshop on Workstation Operating Systems, Key Biscayne, Florida, 23–24 Apr., 1992, pp. 122–125.
Satyanarayanan, "Mobile Computing", Computer, vol. 26, No. 9, Sep. 1993, pp. 81–82.
Kistler, "Increasing File System Availability Through Second–Class Replication", Proceedings: Workshop on the management of Replicated Data, Houston, Texas, 8–9 Nov. 1990, pp. 65–69.

Honeyman et al., "Communications and Consistency in Mobile File Systems", IEEE Personal Communications, vol. 2, No. 6, Dec. 1995, pp. 44–48.
*Disconnected Operation in a Distributed File System,* Carnegie Mellon University, School of Computer Science, 1993, J. J. Kistler, Ph.D. Thesis, pp. 167–184.
*Disconnected Operation in the Coda File System,* Section 4.5.2 "Conflict Handling", Feb. 1992, Kistler et al. pp. 12–13.
*Coda: A Highly Available File System for a Distributed Workstation Environment,* Section, V, "Conflict Resolution", Kistler et al. IEEE Transactions on Computers vol. 39, No. 4, p. 452 Apr. 1990.

*Primary Examiner*—Paul R. Lintz
*Attorney, Agent, or Firm*—Mark S. Walker

[57] ABSTRACT

A method for resolving file system conflicts between a client file system and a server file system after the client file system has been disconnected from the server file system. Changes to the client file system are replayed for application to the server file system. Conflicts between the proposed changes and the current state of the server file system are detected and actions conditioned on the conflict type are presented to a user for selection. User selection and conflict type are used to determine the conflict resolution to apply to the client data during application. All conflicts are resolved as they are detected. The resynchronization process is controllable by the user from a display panel that presents the replay status and allows user interaction to monitor and alter the replay of transactions. The novel interface allows detailed control of the resynchronization.

6 Claims, 3 Drawing Sheets

METHOD AND ARTICLE OF MANUFACTURE FOR RESYNCHRONIZING CLIENT/SERVER FILE SYSTEMS AND RESOLVING FILE SYSTEM CONFLICTS

Cross-reference to Related Applications

The present invention is related to the patent application entitled "Process and Article of Manufacture for Constructing and Optimizing Transaction Logs for Mobile File Systems" Ser. No. 08/572,923 now U.S. Pat. No. 5,745,750.

BACKGROUND OF THE INVENTION

1. Field of the Invention

The present invention relates to computer file systems and particularly to client/server file systems in which two or more computer systems have access to the same file system. More particularly, the present invention relates to methods for resynchronizing a client file system with a server file system after periods of client disconnection. Still more particularly, the present invention relates to mobile file systems used in portable or laptop computers and the process and an article of manufacture for resynchronizing the mobile file system with a server file system.

2. Background and Related Art

Distributed computer systems allow a number of computer "clients" to access a server and to share files on that server. The client workstation is typically connected to the server through some form of network. Laptop computers provide a mobile computing environment to people who must travel in their work or take work with them to customer or work sites. Laptop computers can be connected into a network through either a wired connection, a dial-in connection or some form of optical or radio connection. Infrared connection between a laptop computer and a server is particularly easy to use as the laptop computer must simply be placed in the line of sight of the server infrared sensor.

Any distributed computer environment has the possibility of network interruption and temporary disconnection. Mobile computing using laptop computers increases the frequency of disconnection and includes disconnected operation as a normal operating mode.

Disconnected operation is facilitated by a file caching facility. The CODA system developed by Carnegie Mellon University provides file caching for the Andrew File System (AFS.) CODA provides a mechanism for caching data on a client computer. Changes to the data are logged on the client computer then replayed to the server. Changes that conflict with the current state of the server computer are flagged and their application deferred. CODA is described in the following references. Certification in "Section 7.3, Certification" in *Disconnected Operations in a Distributed File System*, J.J. Kistler, Ph.D. Thesis, Carnegie Mellon University, School of Computer Science, 1993. Conflict handling in "Disconnected Operations in the Coda File System—Section 4.5.2, Conflict Handling," J.J. Kistler and M. Satyanarayanan, *ACM Transactions on Computer Systems*, 10:1 (February 1992). Automated post-replay conflict resolution tools have been proposed as described in, "CODA: a highly available file system for distribute workstation Environments" by M. Satyanarayanan et al in *IEEE Transactions on Computers*, 39(4):447–459, April 1990, Section V, "Conflict Resolution." Another file system for disconnected operations is the Mobile File Sync system from IBM Corp. This system is described in U.S. patent application Ser. No. 08/206,706, filed Mar. 7, 1994, now pending and bearing attorney docket number AT994-014.

Mobile file systems allow the user to connect to a remote server, access files, disconnect and yet still maintain access to the same accessed files. Disconnected file access is supported by caching a copy of the file on the local client machine when it is connected to the remote server. Changes made to the disconnected file system by the user are tracked and re-executed or replayed to the server when a connection is reestablished with the remote server.

The mobile file system must record all transactions that modify the disconnected file system. A logging process is used to track all file system modifications on the cached client and then supports replay of the transactions onto the server. The logging process applies special rules to reorder and optimize the transaction log. Optimization is required to minimize the storage consumed by the transaction log and to minimize the amount of time required to replay and resynchronize the client with the server file system.

The prior art mobile file systems suffer from the technical problem of failing to effectively resolve conflicts detected during the replay of client transactions to the server. A technical problem exists, therefore, to provide an efficient system for resolving detected conflicts. The system should immediately process and resolve any conflict so that the application of client changes to the server is accomplished without delay or massive user effort.

SUMMARY OF THE INVENTION

The present invention provides a process for interacting with the computer user to quickly resolve any conflicts that occur during resynchronization with the server. The present invention collects a log of all file system transactions on the client system. Upon reconnection, the log is replayed to the server. The server checks each transaction for a conflict with the file system on the server. The replay process automatically resynchronizes the client and server file system in the absence of a conflict. If a conflict is detected, the operator is presented with a graphic display to direct resolution of the conflict. The operator then directs resolution of the current conflict before log replay continues.

The present invention is directed to a method for resynchronizing a client file system with a server file after a period of disconnection, the method comprising the steps of: detecting a conflict between a client file system and a server file system; testing the conflict to determine the conflict type; presenting for user action a display of conflict resolution options, the display being selected in response to the conflict type; receiving user action input selecting one or more conflict resolution options; resolving the detected conflict in response to the conflict type and user action input.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
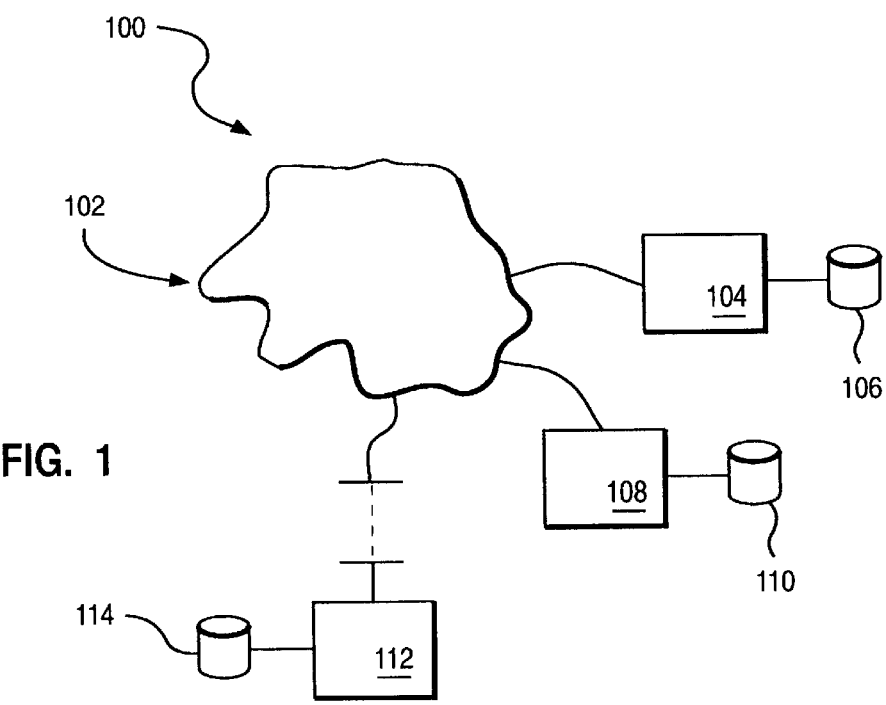
FIG. 1 is a block diagram of a network system according to the present invention.

The present invention operates in a networked computer system such as that shown generally at 100 in FIG. 1. A network 102 connects a number of workstations 104, 108, 112. One of the workstations, e.g. 104, may function as a server. The network 102 can be any known local area network or wide area network such as a token ring or Ethernet network managed by a protocol such as NetBIOS or TCP/IP. Each workstation may or may not contain permanent storage such as hard disks 106, 114, 110. Workstation 112 is shown as being a disconnectable workstation. This workstation is connected through an interface such as an infrared interface. It could also be connected using dial telephone lines. Workstation 112 operates frequently in a disconnected mode and must synchronize with server 104 and the file system contained on permanent storage 106.

Figure 2:
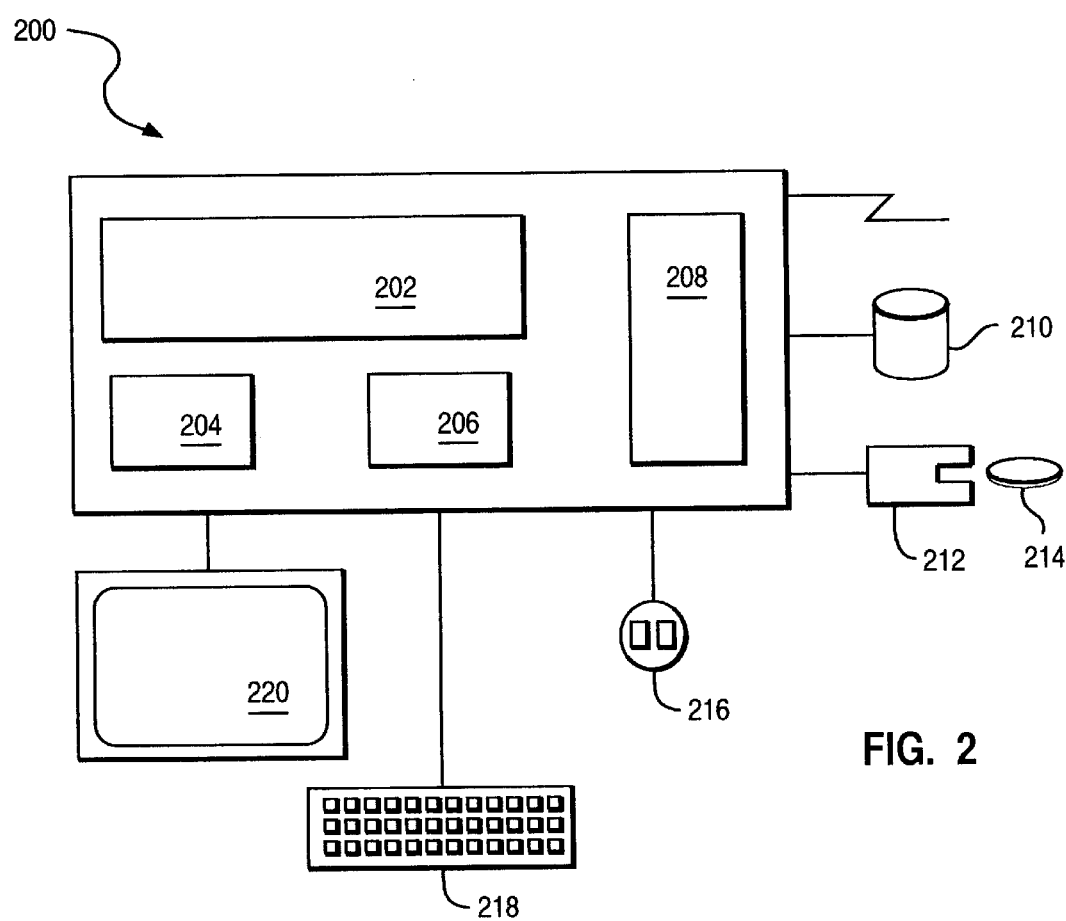
FIG. 2 is a block diagram of a computer system according to the present invention.

Each computer system contains elements similar to those shown in FIG. 2. This configuration is shown as an example only and any other computer configuration could be employed without departing from the invention.

Computer system 200 has a processor element 204 that contains one or more central processing units (CPUs.) Memory 202 is provided to store programs and data. I/O controller 208 controls the communication between the computer system and peripheral devices such as the display screen 220, keyboard 218, pointing device 216, and fixed and removable storage, 210 and 212. Removable storage can be any device such as a diskette drive for magnetic or optical disks 214.

The computer system for the present invention can be any computer system having these basic components. The preferred embodiment uses an IBM Personal Computer or IBM PS/2 system. The invention can also be practice on an IBM RISC System/6000. The present invention operates in conjunction with an operating system such as the IBM OS/2 operating system, the Microsoft Windows operating system or the IBM AIX operating system. Each of these operating systems supports a file system with defined rules for file system management.

The present invention operates during the replay of transactions from the disconnected client to the network server. Disconnected client 112 logs each file system transaction in a transaction log. The types of transactions logged and then monitored during the REPLAY process are those typically supported by OS/2 and other file systems. They are as follows:

CREATE Creates a new file.
STORE Stores data into a pre-existing file.
REMOVE Erases a file.
MKDIR Creates a new directory.
RMDIR Removes a directory.
RENAME Renames a file or directory possibly changing its path.

Figure 3:
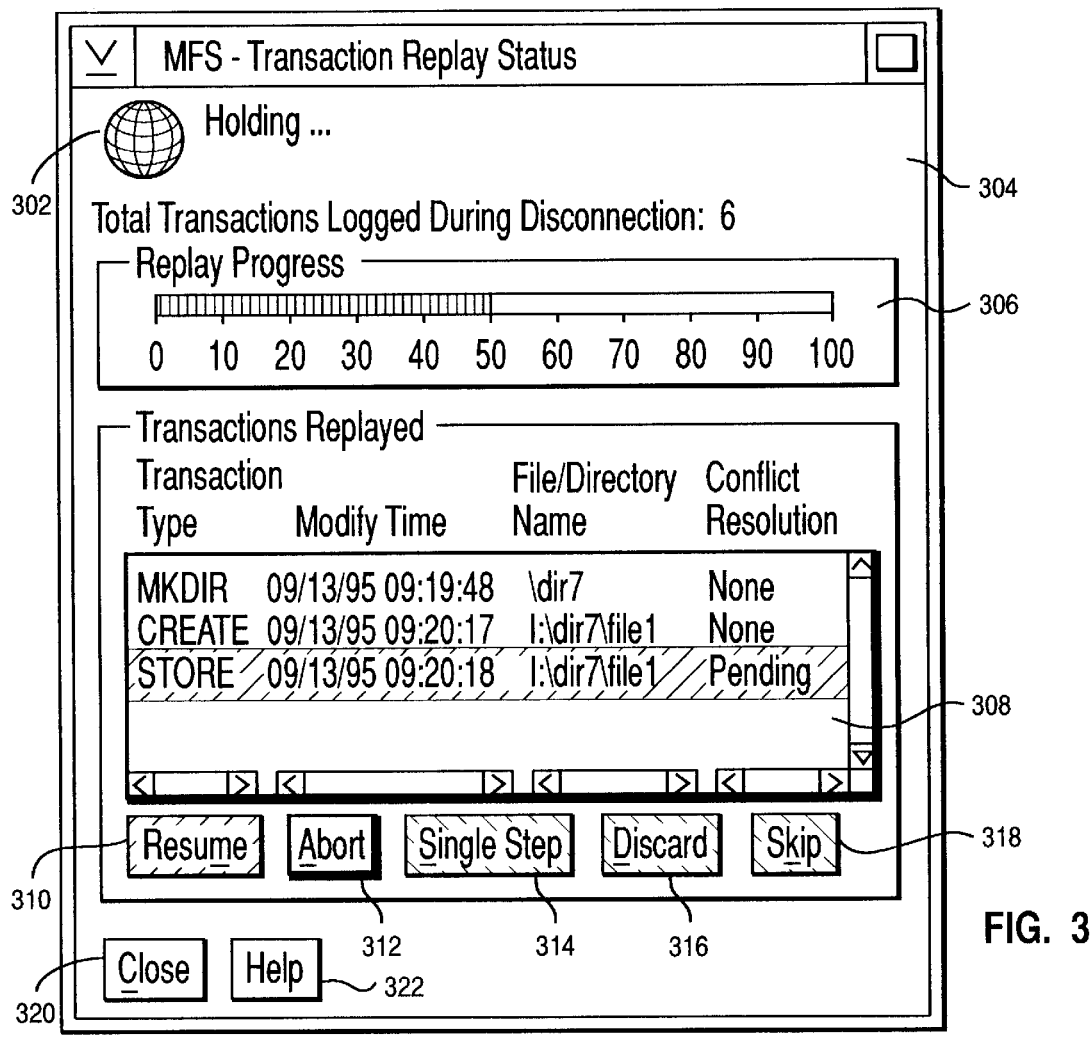
FIG. 3 is an illustration of the operator status panel according to the present invention.

The present invention is implemented in the Replay processing of the file system transaction log. During Replay each transaction is compared to the server file system to determine what action is required and whether or not that action conflicts with the current state of the server file system. FIG. 3 depicts the Transaction Replay Status panel that allows the user to monitor the status and control all aspects of the file system log replay and resynchronization.

The Transaction Replay Status panel is displayed when the mobile file system client has re-connected with the server following a period of disconnection and there are disconnected transactions logged on the client that are awaiting replay. The panel allows the user to monitor the progress and status of transactions as the mobile file system replays them on the remote server. The user is also given the opportunity to alter or abort the REPLAY process at any time during it's progress.

The following window controls are provided to indicate the state of the REPLAY process:
o REPLAY STATUS ICON 302
This icon indicates the current state of the REPLAY process. The icon can have the following states:
RUNNING . . . The REPLAY process is replaying transactions in a continuous mode.
HOLDING . . . The REPLAY process is in single-step mode and is awaiting the user's function-key input.
WAITING . . . A conflict has occurred during REPLAY of a file or directory on the server, and the process is waiting for the user's resolution to the conflict before proceeding.
COMPLETE . . . The REPLAY process has completed, and the mobile file system is waiting for the user to review the transactions and close the panel.
o TOTAL TRANSACTIONS LOGGED 304
This line on the panel displays the total number of transactions logged during the period of disconnection from the server.
o REPLAY PROGRESS INDICATOR 306
This progress indicator displays the percentage of disconnected client transactions that have been REPLAYED onto the server.

The following window controls are provided to monitor the actual transactions that are REPLAYED:
o TRANSACTION LIST BOX 308
This list box indicates the actual logged client transactions that have been REPLAYED on the server thus far. The last entry at the bottom of the list box is usually highlighted, which indicates that it is pending REPLAY. The user can only alter REPLAY for the pending transaction using the push buttons provided.

The following information is provided for each transaction:
TRANSACTION TYPE The type of file system transaction formed. (i.e. one of the OS/2 file system transactions listed earlier)
LAST MODIFY DATE & TIME The date and time the disconnected transaction was performed.
FILE/DIRECTORY NAME The target file or directory which was altered by the transaction.
CONFLICT RESOLUTION The user resolution of a conflict generated from the REPLAY of a transaction on the server. This list box column can contain various conflict resolution keywords. They are as follows:
RENAMED The file or directory was renamed when REPLAYED on the server.
REPLACED The target file or directory was replaced on the server with the client copy.
STORED The target file or directory was stored onto the server.
APPENDED The target file or directory was appended to the existing copy on the server.
PENDING The transaction is still pending REPLAY.
SKIPPED The transaction was skipped during REPLAY due to a user directive. The transaction
REPLAY will be attempted again during the following resynchronization phase with the server.
DISCARDED The transaction was discarded during REPLAY due to a user directive or a conflict resolution. The transaction is lost and will not be REPLAYED at a later time.

NONE No conflict occurred.

The following window controls are provided to allow the user to alter or abort the REPLAY process:

o ABORT PUSH BUTTON 312

This push button can be used at any time to abort the REPLAY of the remaining transactions in the log. These transactions will not be REPLAYED on the server until the following resynchronization phase. The user is prompted for confirmation when selecting this option.

o STOP/RESUME PUSH BUTTON 310

This push button is used in the "Running . . ." state to pause the continuous replay of transactions on the server. While in this state, the push-button is labeled "Stop" and is color-coded red. It may also be used during the "Holding . . ." state to resume the continuous replay of transactions. While in this state, the push-button is labeled "Resume" and is color-coded green.

o SINGLE-STEP PUSH BUTTON 314

This push button is used in the "Holding . . ." state to REPLAY only the pending transaction and then pause.

o SKIP PUSH BUTTON 318

This push button is used in the "Holding . . ." state to skip the pending transaction. The transaction remains in the log, and its REPLAY will be attempted during the next resynchronization phase with the server.

o DISCARD PUSH BUTTON 316

This push button is used in the "Holding . . ." state to discard the pending transaction. The transaction is permanently deleted from the log, and its REPLAY is never re-attempted.

o CLOSE PUSH BUTTON 320

This push button closes the status window and allows the continuous REPLAY of transactions to proceed in the background. The user will only be notified if conflicts arise during the REPLAY process.

Figure 4:
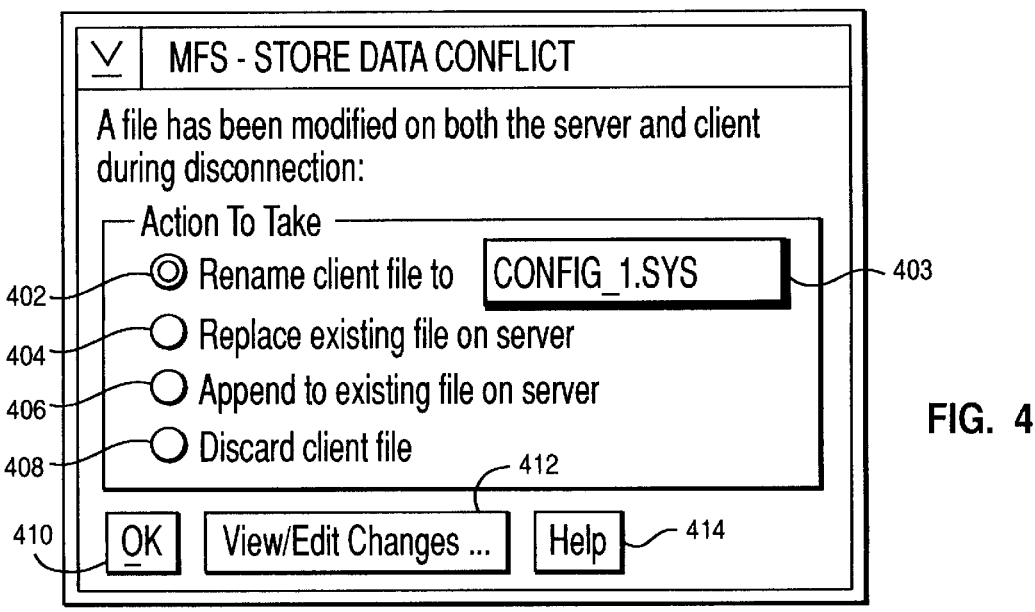
FIG. 4 is an illustration of the operator conflict identification panel according to the present invention.

The above Replay process attempts to resynchronize the client and server file systems automatically. This can be done, for example, where the server file system has not changed since the client was last connected. In that case, any changes to the client system can be applied directly to the server file system. The server file system, however, may be subject to change during disconnection. These changes can include creating, renaming or deleting (removing) files from the server system or changing those files by editing. The replay process detects conflicts between the server and client file systems. Conflicts are presented to the user for action. FIG. 4 illustrates a display of resolution actions provided for user input.

A conflict is usually detected by comparing the current date and time stamp (i.e. Version Number) of the transaction's target file or directory on the server with the version number recorded prior to the last server disconnection. If the file or directory was modified on the server during the disconnection, then the version numbers will no longer match and a conflict will be flagged. When a conflict is flagged, the user is presented with a graphic user interface with various options for resolving the particular conflict. A mobile file system is subject to many different conflicts and the user's options for resolution will vary accordingly. The following is a list of user interfaces resolution options for each transaction type:

o STORE CONFLICTS

- DATA CONFLICT PANEL

This window, FIG. 4, is displayed during the REPLAY process when both the client and server copies of a file have been updated during the disconnected state. The user can use the "View/Edit Changes . . ." push button 412 to display the differences between the client and server copies of the file if the target file is in ASCII format. The user must select one of the following conflict resolution options before the REPLAY process can proceed:

—RENAME 402

This radio button can be selected to rename the client file when REPLAYING it onto the server. A default versioned name is provided in the accompanying entry field 403 but can be changed by the user.

—REPLACE 404

This radio button replaces the existing server copy of the file with the contents of the client copy during REPLAY of the file.

—APPEND 406

This radio button appends the contents of the client copy of the file onto the contents of the server copy during REPLAY of the file.

—DISCARD 408

This radio button discards the client copy of the file instead of REPLAYING it onto the server.

—EDIT 412

Figure 5:
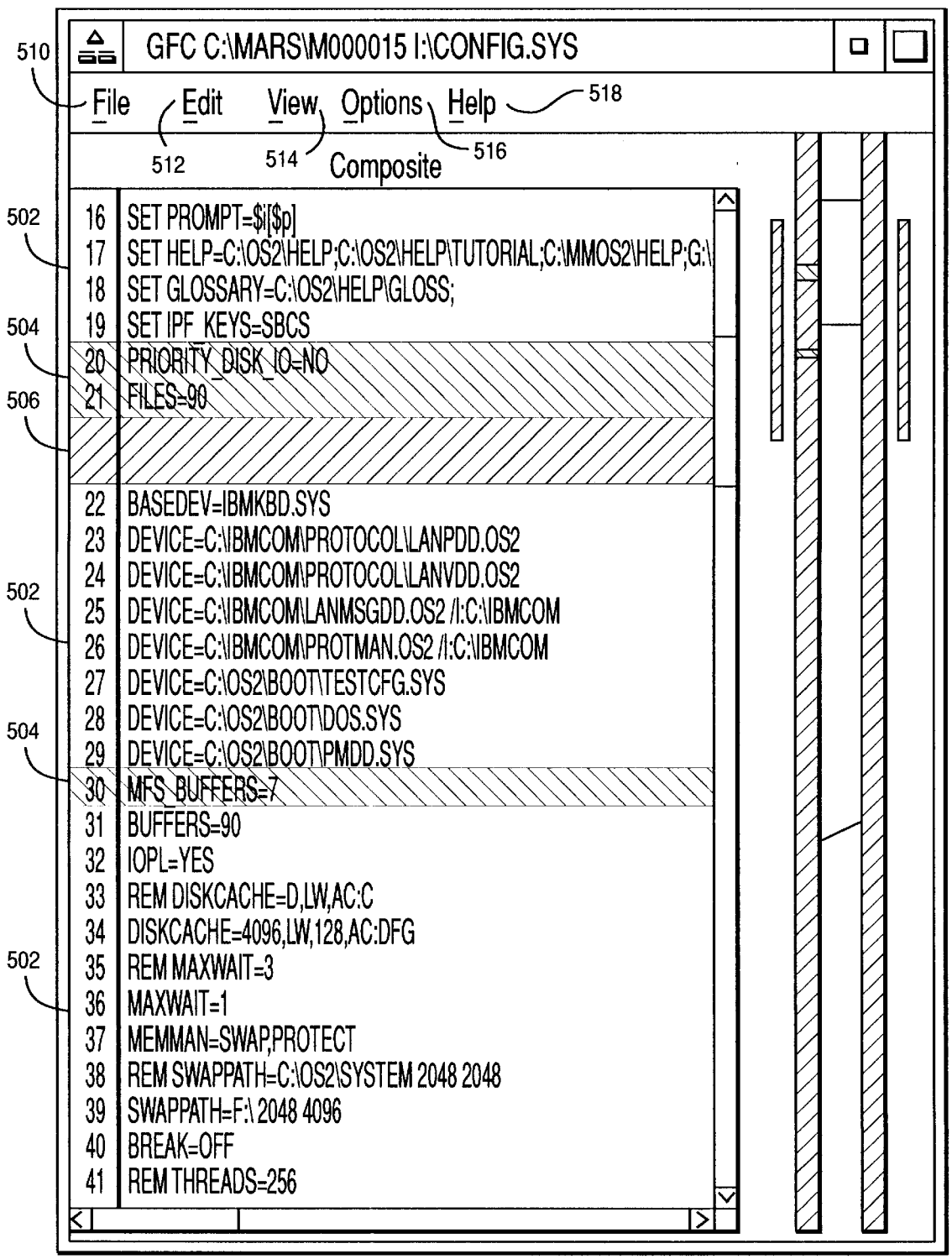
FIG. 5 is an illustration of the operator conflict resolution edit panel according to the present invention.

The VIEW/EDIT CHANGES 412 push button invokes a graphical file compare utility (as shown in FIG. 5.). This utility highlights the differences between the client and server copies of the file. The data will only be of value on ASCII text files. The following color codes are used within the file viewer:

WHITE 502 This line of text exists in both the client and server copies.

YELLOW 504 This line of text was added to the client copy during disconnection.

RED 506 This line was added to the server copy during disconnection.

The composite of changes between the cached client and server files can be edited using the cut and paste functions provided by the graphical file compare utility. The "edit" pull-down menu item 512 is used to access edit functions. Each line can be marked using an italic font. It can then subsequently be (1) cut from document, (2) copied to a buffer, (3) pasted after the line containing the cursor, or (4) deleted from the document. The resulting edited composite can then be stored into the server file in order to resolve the conflict. This is accomplished by selecting the SAVE COMPOSITE option from the "File" pull-down menu 510.

—- UPDATE/RENAME CONFLICT PANEL

This window is displayed during the REPLAY process when the client copy of a file is updated during disconnection, but the server copy can no longer be found during replay. This indicates that the server copy was either deleted or renamed by another client while the current client machine was disconnected from the server. The user must select one of the following conflict resolution options before the REPLAY process can proceed:

—STORE

This radio button stores the contents of the client copy of the file onto the server drive with the specified file name. The default name provided is the original server file name.

—DISCARD

This radio button discards the client copy of the file instead of REPLAYING it onto the server.

- FILE VERSUS DIRECTORY CONFLICT PANEL

This window is displayed during the REPLAY process when a file is modified on the client, but during resynchronization the REPLAY process detects that the file was deleted on the server, and a directory with the same name was created on the server. The user must rename the client file before the REPLAY process can proceed. A default versioned file name is provided but can be changed by the user.

- MISSING PARENT CONFLICT PANEL

This window is displayed during the REPLAY process when a file is modified on the client, but its parent directory was deleted or renamed on the server during the disconnected state. The user must rename the client file before the REPLAY process can proceed. A default file name is provided but can be changed by the user.

- LOCKED FILE CONFLICT PANEL

This window is displayed during the REPLAY process whenever a file was modified on the client, but the modifications can not be propagated to the server because the file on the server is currently locked by another process. The user must rename the client file before the REPLAY process can proceed. A default file name is provided but may be changed by the user.

o CREATE CONFLICTS

- NAME CONFLICT PANEL

This window is displayed during the REPLAY process when both the client and server copies of a file have been created during the disconnected state with identical names. The user must select one of the following conflict resolution options before the REPLAY process can proceed

—RENAME

This radio button can be selected to rename the client file when REPLAYING it onto the server. A default versioned name is provided in the accompanying entry field but can be changed by the user.

—REPLACE

This radio button replaces the existing server copy of the file with the client copy during REPLAY of the file.

—DISCARD

This radio button discards the client copy of the file instead of REPLAYING it onto the server.

- FILE VERSUS DIRECTORY CONFLICT PANEL

This window is displayed during the REPLAY process when a file is created on the client with the same name as a directory on the server. The user must rename the client file before the REPLAY process can proceed. A default versioned file name is provided but can be changed by the user.

- MISSING PARENT CONFLICT PANEL

This window is displayed during the REPLAY process when a file is created on the client, but its parent directory is deleted or renamed on the server during the disconnected state. The user must rename the client file before the REPLAY process can proceed. A default file name is provided but can be changed by the user.

o MKDIR CONFLICTS

- NAME CONFLICT PANEL

This window is displayed during the REPLAY process when both client and server directories have been created during the disconnected state with identical names. The user must select one of the following conflict resolution options before the REPLAY process can proceed:

—RENAME

This radio button can be selected to rename the client directory when REPLAYING it onto the server. A default versioned name is provided in the accompanying entry field but can be changed by the user.

—MERGE

This radio button merges the contents of the client directory with the contents of the server directory during REPLAY.

—DISCARD

This radio button discards the client copy of the directory instead of REPLAYING it onto the server:

- FILE VERSUS DIRECTORY CONFLICT PANEL

This window is displayed during the REPLAY process when a directory is created on the client with the same name as a file on the server. The user must rename the client directory before the REPLAY process can proceed.

- MISSING PARENT CONFLICT PANEL

This window is displayed during the REPLAY process when a directory is created on the client, but its parent directory is deleted or renamed on the server during the disconnected state. The user must rename the client directory before the REPLAY process can proceed. A default directory name is provided but can be changed by the user.

o RENAME CONFLICTS

- TARGET CONFLICT PANEL

This window is displayed during the REPLAY process when a file or directory is renamed on the client, but a file or directory with the same target name was created on the server during the disconnected state. The user must rename the target name before the REPLAY process can proceed. A default name is provided but can be changed by the user.

- TARGET MISSING PARENT CONFLICT PANEL

This window is displayed during the REPLAY process when a file or directory is renamed on the client, but its target parent directory was deleted or renamed on the server during the disconnected state. The user must rename the target name before the REPLAY process can proceed. A default name is provided but can be changed by the user.

- SOURCE FILE LOCK CONFLICT PANEL

While disconnected, a transaction was performed causing a file to be renamed. During resynchronization with the server, an attempt was made by the file system to replay this transaction on the server. However, the file system has detected that this particular file is locked on the server by another process. Therefore, the RENAME transaction cannot be performed. However, the user is still given the option of creating the target file of the RENAME transaction by extracting the source file contents from the client's cache and copying them to the server as the target file name. The source file on the server remains unchanged. The user must select one of the following conflict resolution options before the REPLAY process can proceed:

—PROCEED

This push button proceeds with the REPLAY of the transaction on the server using the target name of the RENAME transaction and the client's cached file contents.

—IGNORE

This push button ignores the transaction thus preserving the source file on the server and not creating the target file.

o REMOVE CONFLICTS

- FILE UPDATE CONFLICT PANEL

While disconnected, a transaction was performed causing a file to be removed. During resynchronization with the server, an attempt was made by the file system to replay the transaction onto the server. However, the file system detected that the file was modified on the server during disconnection. Therefore, any changes made would be lost. The user must select one of the following conflict resolution options before the REPLAY process can proceed:

—PROCEED

This push button proceeds with the REPLAY of the transaction thus deleting the file from the server.

—IGNORE

This push button ignores the transaction thus preserving the file on the server.

- FILE LOCK CONFLICT PANEL

While disconnected, a transaction was performed causing a file to be removed. During resynchronization with the server, an attempt was made by the file system to replay this transaction on the server. However, the file system has detected that this particular file is locked on the server by another process. Therefore, the REMOVE transaction cannot be performed. The transaction will be skipped and replay will continue with the next logged transaction.

o RMDIR CONFLICTS

- DIRECTORY UPDATE CONFLICT PANEL

While disconnected, a transaction was performed causing a directory to be removed. During resynchronization with the server, an attempt was made by the file system to replay the transaction onto the server. However, the file system detected that the contents of the directory were modified on the server during disconnection. Therefore, any changes made would be lost. The user must select one of the following conflict resolution options before the REPLAY process can proceed:

—PROCEED

This push button proceeds with the REPLAY of the transaction thus deleting the directory and all its contents from the server.

—IGNORE

This push button ignores the transaction thus preserving the directory on the server.

—DIRECTORY LOCK CONFLICT PANEL

A client transaction removed a directory while disconnected. An attempt was made by the file system to replay this transaction on the server during resynchronization. However, the file system detects that the removed directory is locked on the server by another process. The RMDIR transaction replay cannot be performed due to the lock. The transaction will be skipped and replay will continue with the next logged transaction.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A method for resynchronizing a client file system with a server file system after a period of disconnection, the method comprising the steps of:

detecting a conflict between a client file system and a server file system;

testing the conflict to determine the conflict type;

presenting, for user action at the time of conflict detection a display of conflict resolution options, the display being selected in response to the conflict type;

receiving user action input selecting one or more conflict resolution options;

resolving the detected conflict in response to the conflict type and user action input; and continuing resynchronizing.

2. The method of claim 1, wherein each conflict type is resolved by presenting an operator interaction panel for that conflict type and wherein the user actions are selected from the interaction panel.

3. The method of claim 1, wherein the conflict types include:

a STORE conflict in which a client STORE transaction conflicts with the status of a file on the server file system;

a CREATE conflict in which a client CREATE transaction conflicts with an existing file system name on the server;

a MKDIR conflict in which a client MKDIR transaction conflicts with an existing file system name on the server;

a RENAME conflict in which a client RENAME transaction conflicts with an existing file system name on the server;

a REMOVE conflict in which a client REMOVE transaction conflicts with the status of a file on the server; and a RMDIR conflict in which a client RMDIR transaction conflicts with the status of a directory on the server.

4. A method of providing operator interaction to a process of synchronizing a client file system with a server file system in a computer system having a processor means, memory means and a display, the method comprising the steps of:

displaying a transaction status indicator on said display for each of a plurality of client file system transactions as said process of synchronizing is performed;

displaying a plurality of selectable user actions on said display;

receiving a user selection of one of said selectable user actions; and changing the synchronizing process in response to said user selection.

5. The method of claim 4, wherein the changes in the synchronization process include:

freezing the replay log and causing the synchronization process to proceed in single step mode one transaction at a time;

releasing the frozen replay log and causing the synchronization process to proceed continuously;

suspending the synchronization process for resumption at a later time;

skipping a replay log transaction in single step mode for resumption at a later time; and discarding a replay log transaction in single step mode.

6. A computer program product having a computer readable medium having computer program logic recorded thereon for resynchronizing a client file system with a server file system after a period of disconnection, said computer program product comprising:

computer program product means for causing a computer system to detect a conflict between a client file system and a server file system;

computer program product means for causing a computer system to test the conflict to determine the conflict type;

computer program product means for causing a computer system to present for user action at the time of conflict determination a display of conflict resolution options, the display being selected in response to the conflict type;

computer program product means for causing a computer system to receive user action input selecting one or more conflict resolution options;

computer program product means for causing a computer system to resolve the detected conflict in response to the conflict type and user action input; and computer program product means for causing a computer system to continue synchronization processing.

* * * * *